Sept. 29, 1959 B. L. EALES ET AL 2,906,053
FLYING EEL FISH LURE
Filed Aug. 2, 1954

BEN L. EALES
VERL M. ELDER
INVENTORS

BY Loyal H. McCarthy
ATTORNEY.

United States Patent Office 2,906,053
Patented Sept. 29, 1959

2,906,053

FLYING EEL FISH LURE

Ben L. Eales and Verl M. Elder, La Grande, Oreg.

Application August 2, 1954, Serial No. 447,087

3 Claims. (Cl. 43—42.51)

Our invention relates to lures for use in both sports and commercial fishing in lieu of fish bait, or for attracting fish to bait used in connection with the lure.

One of the objects of our invention is to provide a lure which can be readily adapted to the speed of movement which the user may desire.

Another object of our invention is to lure fish to the hook partially by actions of the lure in the water as created by the manual adjustment of the wings and partially by the angles and curvatures incorporated in the body.

Still another object of our invention is to provide a lure of the character described which is inexpensive to manufacture, easily adjusted and efficient in its operation.

Further advantages of the invention will be apparent from the description and claims.

Referring to the drawings.

Figure 1:
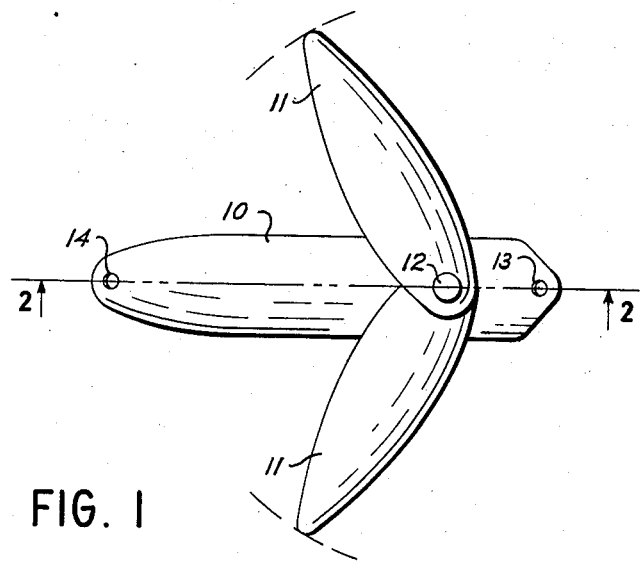
Fig. 1 is a top plan view of our flying eel fish lure showing the pivotal attachment of the wings.

Referring further to the drawings:

The body 10 of the fish lure is slightly concavo-convex for a comparatively short portion of its total length at its forward end with the convexity on the upper surface, relatively deeply concavo-convex for approximately one-half its entire body length at the hook or rear end, and substantially flat between the forward and rear ends. The convexity of the rear portion of the lure is also on its upper surface. The plan view of the body of the lure presents a front end convexly curved forwardly with smooth sides extending rearwardly from the curved front end for a substantial portion of its length before converging on a curvature to form the rear end of the body. Wings 11 are of elongated oval shape, slightly concavo-convex and are pivotally and snugly secured to the body 10 by means of a rivet 12 through holes 16 of the wings 11 and the hole 15 at the body 10. The wings 11 are secured by means of the rivet 12 and the hole 15 and 16 on the flat portion of the body 10. A hole 13 is provided near the front end of the body 10 in the slightly concavo-convex portion thereof for receiving a fish line or snell. A hole 14 is provided near the rear end of the body of the lure for the purpose of enabling a fish hook to be secured thereto by any suitable means.

Figure 2:
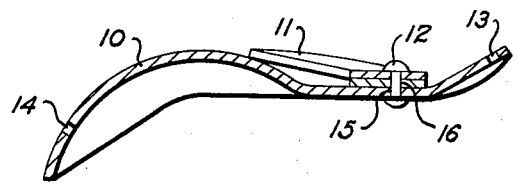
Fig. 2 is an elevational sectional view of the lure taken in the direction of the arrows along the line 2—2, Fig. 1.
Figure 3:
Fig. 3 is a longitudinal sectional view on an enlarged scale through the middle of a typical wing element of our lure.

As best seen in Fig. 2 the slightly concavo-convex forward end of the body 10 of the lure is upturned at an angle of approximately 30° to the flat mid portion of the lure. The relatively deeply concavo-convex rear portion of the body of the lure at a point slightly more than half the length of the lure from its forward end arcs upwardly and rearwardly relative to the flat middle portion of the body of the lure and then curves downwardly so that the rearmost end of the rear portion terminates at a point which is below the plane of the under surface of the flat mid portion of the body and rearwardly therefrom approximately at an angle of 150° thereto.

The hole 15 is positioned near the forward end of the lure in the flat portion thereof and by means of the rivet 12 snugly and pivotally retains the wings 11, one on top of the other, on the top surface of the body of the lure. The holes 16 in the wings 11 by means of which the wings are pivotally secured by the rivet 12 to the body 10 are near the larger, or base, ends of the elongated oval shapes of the wings. The smaller ends of the oval shapes of the wings are disposed outwardly and rearwardly from the point of attachment of the wings to the body 10 and constitute the tips of the wings. Each wing is slightly concavo-convex both longitudinally and laterally and is positioned on the body 10 of the lure with the convexity on its upper surface. Due to the sharply arched longitudinal curvature of the rear portion of the body of the lure and the point of attaching the wings 11 to the body of the lure the tip ends of the wings 11 will be raised higher above the base ends of the wings as the wings 11 are pivoted more closely toward each other. As the tip ends of the wings 11 are pivoted further apart the angle at which the wings are disposed relative to the body will become smaller. It is by widening or narrowing the angle formed by the wings 11, accomplished by pivoting the wings around the rivet 12, that the speed of the action of the lure in the water may be decreased or increased in accordance with the desires of the user.

It is understood that the body and wings of the lure may be of any desirable or suitable materials, colors or combination thereof.

Having described our invention, what we claim is:

1. A fish lure consisting of a body of relatively thin material with its front end rounded forwardly and horizontally, with rearwardly extended sides and a curved rear end, having a short portion of its fore end angled upwardly, said fore end portion being concavo-convex transversely with the convexity on the upper surface, having a flat central portion and having a relatively long rear portion arched rearwardly and upwardly a slight distance above and there rearwardly and downwardly a substantial distance, below said flat central portion said arched rear end portion being deeply concavo-convex transversely with the convexity on the upper surface; a pair of longitudinally and transversely concavo convex wings of elongated oval shape, each provided with a hole therethrough near one end thereof and each positioned in a plane approximately horizontal with the center portion of said body; and a rivet, disposed vertically in said body, pivotally attaching each of said wings, one above the other, by means of said holes to the top surface of said body rearwardly of said upturned fore end with the convexity of each wing on its upper surface, each said wings being adapted to have its horizontal and longitudinal angular relationship to said body changed as the angular position of said wings to each other is changed.

2. In a fish lure: a body of relatively thin material with its front end convexly curved forwardly and with smooth sides extending rearwardly from the front end for a substantial portion of its length and then converging horizontally to form a curved rear end, the fore and rear end portions of said body being curved reversely to each other vertically and being concavo-convex laterally with the convexity on the upper surface, the said vertical curvature of the rear portion of the body being arcked rearwardly a short distance and then arched rearwardly and upwardly a short distance and then arcked rearwardly and downwardly a considerable distance; a pair of wings of elongated oval construction, horizontally and longitudinally, each having a length of approximately three times its width, said wings being positioned one above the other on the upper surface of said body, and each of said wings being provided with a hole therethrough near one end thereof; a pivotal rivet through the hole of each of said wings, securing said wings tightly but movably to the body a short distance rearwardly from the fore end of said body and in front of the point at which the curvature of the rear of the body begins, said curvature being adapted to slightly change the horizontal angular relationship of said wings to said body in each lateral angular position of said wings to each other and to said body.

3. In a fish lure the combination of: a body of relatively thin material, the upper surface of which is upwardly convex in its width at its fore and rear end portions, with its front end convexly curved forwardly and with smooth sides extending rearwardly from the front end for a substantial portion of its length and then converging to form a curved rear end horizontally, said end portions being spaced apart by a flat central portion and curving reversely to each other longitudinally and vertically, the said vertical curvature of the rear portion of the body being arcked rearwardly and upwardly to a point above and behind the central portion of the body and then arcked rearwardly and downwardly to a point considerably below and behind the central portion of said body; a pair of wings of elongated oval construction, each having a length approximately three times its width and each being provided with a hole therethrough near the large oval end thereof, the surfaces of said wings being concavo-convex longitudinally and transversely with the convexity on the upper surfaces; and a pivotal rivet, disposed vertically in said body, through the hole of each of said wings, securing said wings tightly but movably at a point rearwardly of the upturned concavo-convex fore end of the body and forwardly of the curvature of the rear portion of the body.

References Cited in the file of this patent

UNITED STATES PATENTS

| | | |
|---|---|---|
| 1,575,139 | Wiesenfeld | Mar. 2, 1926 |
| 1,738,617 | Scharrer | Dec. 10, 1929 |
| 1,830,080 | Allen | Nov. 3, 1931 |
| 1,861,110 | Campbell | May 31, 1932 |
| 2,605,574 | Rolf | Aug. 5, 1952 |
| 2,717,468 | Clough | Sept. 13, 1955 |